W. M. CHACE.
AUTOMATIC VALVE.
APPLICATION FILED JUNE 25, 1917.
1,323,830.
Patented Dec. 2, 1919.
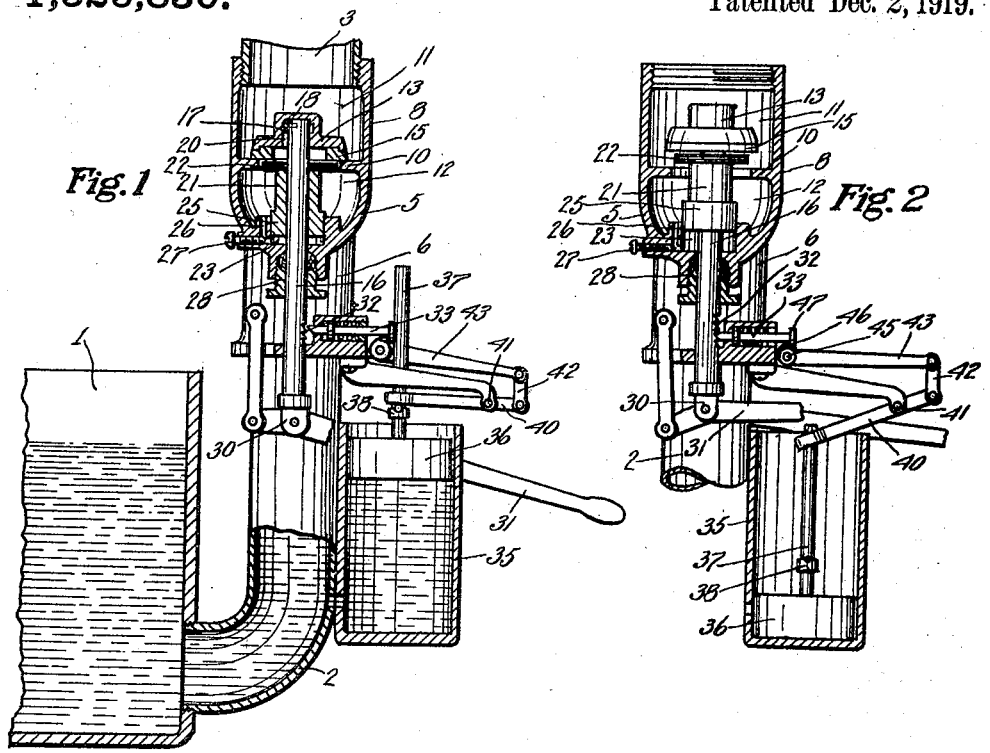
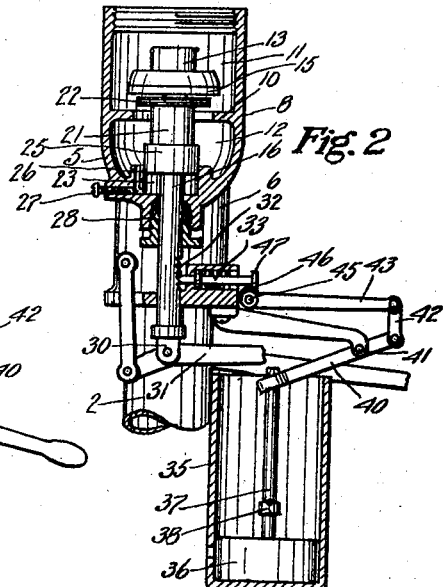
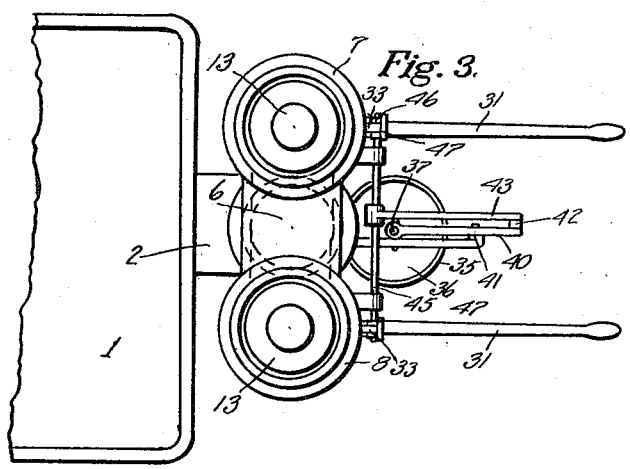
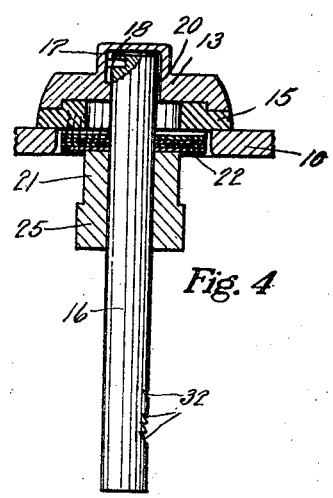
INVENTOR
William M. Chace,
BY
Horace Barnes
ATTORNEY

UNITED STATES PATENT OFFICE.

WILLIAM M. CHACE, OF VANCOUVER, BRITISH COLUMBIA, CANADA.

AUTOMATIC VALVE.

1,323,830.  Specification of Letters Patent.  Patented Dec. 2, 1919.

Application filed June 25, 1917. Serial No. 176,893.

*To all whom it may concern:*

Be it known that I, WILLIAM M. CHACE, citizen of the United States, and resident of Vancouver, British Columbia, whose post-office address is Gen'l Delivery, said Vancouver, have invented a new and useful Improvement in Automatic Valves, of which the following is a specification.

This invention relates to improvements in automatic valves for controlling the supply of water to a tank or tub such as is employed in laundries and other like uses. The invention has for its object the provision of a valve of simple construction which will close with the water pressure and without such undue rapidity as will cause fluttering of the movable valve member or the phenomenon known as "water hammer".

A further object of the invention is the provision of a means for adjusting the valves to various pressures of water so that the valve will close under the slightest appreciable pressure as well as when the pressure is relatively great.

A still further object of the invention is the provision of means for automatically tripping the valve to cause it to close when the water in the tub has reached a predetermined height.

With these objects in view the invention consists in the novel construction of a valve and the adaptation and combination therewith of said tripping devices as will be fully described in the following specifications, illustrated by the accompanying drawings and finally set forth in the appended claims.

In said drawings Figure 1 is a view in vertical section of an automatic valve embodying my invention, the valve being shown in closed condition.

Fig. 2 is a similar view showing the valve open.

Fig. 3 is a plan view of Fig. 1.

Fig. 4 is a vertical sectional view of the movable valve member on an enlarged scale shown resting on its seat.

Referring to said views the reference number 1 indicates a tank or tub such as is commonly employed in laundries and 2 the water supply pipe leading thereinto, into which hot and cold water are conducted through their respective conduits such as indicated at 3.

A duplex valve body indicated generally by the numeral 5 is formed with an outlet portion 6 communicatively connected with the pipe 2 and a pair of branched casings 7 and 8 for hot and cold water supply, respectively. Pipes 3 connecting with the source of hot and cold water supply respectively are connected to the upper ends of said casings 7 and 8. As the valves included in casings 7 and 8 are substantially identical the detailed description of one of them will suffice to explain the construction and mode of operation of both.

Referring to Fig. 1 the casing 8 is divided by a partition 10 into chambers 11 and 12 above and below said partition, respectively. Said partition is formed centrally with a valve passage and the upper face of said partition constitutes a valve seat for a movable valve member 13, said valve member having a fiber facing 15 arranged to contact with said seat 10. The valve member 13 is loosely mounted on a valve stem 16 in order that it may adjust itself to its seat and prevent any passage of water thereby. The valve member will ordinarily remain positioned on the stem 16, when elevated from its seat, but to guard against accidental displacement it is formed with an annular slot 17 into which a pin 18 projects from the stem. A vertical slot 20 extends from the lower face of the valve member to the slot 17 to allow for the passage of the pin 18 to within the slot 17.

Below said valve member 13 on the stem 16 is a rigidly mounted sleeve 21 between which and the valve member is interposed a collar comprised of a plurality of disks 22, concentrically apertured to receive said stem and mounted loosely with respect to each other and the sleeve 21.

The diameter of said disks is slightly less than the diameter of the opening in the partition 10 so as to allow approximately a sixteenth of an inch space therebetween when the valve is closed or partially closed. The lower portion of the chamber 12 is provided with a cylindrical compartment 23 in which an enlarged portion 25 of the sleeve 21 is arranged to reciprocate providing a form of dash-pot and affording a suction to prevent the too rapid closing of the valve through the confinement of fluid in said chamber 23, which when the plunger 25 moves downwardly as when the valve is closing, the fluid is caused to pass through a restricted by-pass 26 and is thus gradually brought to its seat. Screw 27 is arranged to regulate the effective size of the by-pass 26 to cause the valve to seat more or less readily.

The valve stem 16 passes through the bottom of the valve body 7 through a packed gland 28 and terminates in a bifurcated end 30 to which an operating handle 31 is pivoted. Said stem is further provided with a plurality of notches 32 any one of which may be engaged by a spring pressed dog 33 in order that said valve member may be maintained at any predetermined height to which it may be elevated by means of the handle 31.

Rigidly connected to said pipe 2 is an open-topped fluid chamber 35 communicatively connected near its bottom with the tank 1. 36 indicates a float retained in said chamber 35 and provided with an axially arranged vertical stem 37 provided with a collar 38 adjustable to various heights along its length. 40 indicates a trip bar having one of its ends apertured to receive the stem 37 and being pivoted at 41, while its opposite end is connected by a link 42 to a lever 43 whose opposite end is journaled to a transverse rod 45 and provided thereat with a hook 46 arranged to engage the head 47 of the said dog 33, so that when the float 36 is elevated by the rise of water in the chamber 35 to a predetermined height the collar 38 will engage the trip bar 40 which through its intermediate connections will depress the outer end of the lever 43 and retract the dog 33 from its engagement with the respective notches 32, thus releasing the valve stem 16 and allowing the valve member 13 to be seated through the pressure of the water thereupon.

It will be understood that valve bodies 7 and 8 will both conduct the fluids flowing therethrough to the portion 6 and that one of said bodies will control the passage of hot water and the other of cold water. The operator in determining the relative temperatures of the water flowing through each of said valves and the temperature of the water in the tub which will adjust the openings afforded between the valve members 13 and their seats by manipulating the handle 31 and securing the valve seats at such positions by means of the dogs 33. By means of the relative closeness of the disks 22 to the bottom of the valve 13 the valve stem must be elevated to a considerable extent before a relatively full volume of water can pass by the disks 22. But when the stem 16 is released to allow the valve to close, said disks will partially shut off the opening in the partition 10 almost immediately and prevent any undue suction or drawing of the water from below, while the pressure from above will exert its full force and effect in closing the valve.

It is found that a reduction of the number of disks 22 in order to decrease their aggregate thickness increases the rapidity with which the valve will close, therefore, under extraordinary heavy pressures a relatively large number of disks are utilized while if the pressures under which the valve is intended to work are less the number of disks 22 is reduced accordingly.

What I claim is:

1. A valve of the class described, embodying a valve casing, a stem extending axially upward through the bottom of said casing and having a plurality of notches provided therein, a loosely mounted valve-member on the upper extremity of said stem arranged to close the passage through said casing in response to pressure of fluid, a handle operatively connected to the projecting end of said stem to raise said valve member off its seat, a spring pressed dog adapted to engage within said notches to maintain said stem and valve-member in raised position, a fluid chamber, a float in said chamber, a trip lever arranged to be engaged by said float, and operative connection between said trip lever and said dog for withdrawing the latter to release said valve stem in response to a predetermined height of fluid in said chamber.

2. A valve of the class described, embodying a valve-casing, a stem extending axially upward through the bottom of said casing and having a plurality of notches provided therein, a loosely mounted valve-member on the upper extremity of said stem arranged to close the passage through said casing in response to pressure of fluid, a handle operatively connected to the lower end of said valve stem to raise said valve off of its seat, a spring pressed dog adapted to engage within the notches in said valve stem to maintain said valve member in a raised position, a fluid chamber, a float in said chamber and having an upwardly projecting stem provided with a collar, a trip lever arranged to be engaged by said collar, a fixed bracket to which said trip lever is pivoted, a lever arm in engagement with said dog to withdraw said dog against the pressure of its spring and a link connecting the outer end of said lever arm with the outer end of said trip lever whereby when said float raises the inner end of said trip lever said valve stem will be released.

3. A valve of the class described comprising a valve casing having a partition therein formed with an aperture, a valve stem extending through said aperture, a valve member removably secured on the upper end of said valve stem, a sleeve on said stem below said valve member and a plurality of disks removably interposed between said valve member and said sleeve said disks being of slightly less diameter than the aperture in said partition and constituting a cylindrical projection below said valve member the thickness of which may be varied by varying the number of disks to regulate its retarding effect on the closing of the valve.

Signed this 8th day of June, 1917.

WILLIAM M. CHACE.